Feb. 27, 1934.  J. W. McNAIRY  1,949,216
POWER SYSTEM
Filed April 8, 1933
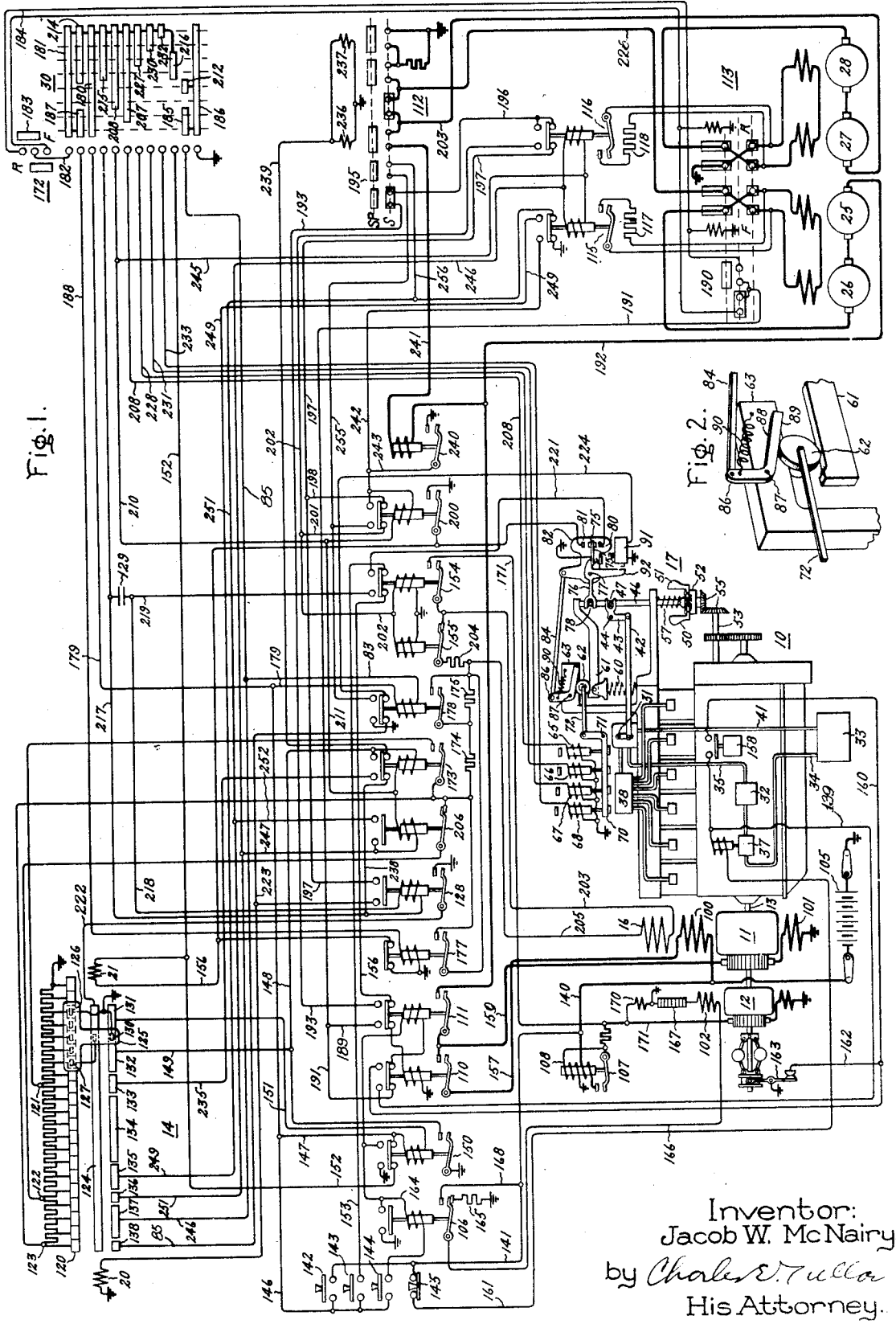
Inventor:
Jacob W. McNairy,
by Charles W. Tulla
His Attorney.

Patented Feb. 27, 1934

1,949,216

UNITED STATES PATENT OFFICE 1,949,216

POWER SYSTEM

Jacob W. McNairy, Erie, Pa., assignor to General Electric Company, a corporation of New York Application April 8, 1933. Serial No. 665,144

30 Claims. (Cl. 290—17)

My invention relates to power systems, and more particularly to power systems in which a prime mover is arranged to drive an electric generator, which supplies current to electric driving motors, such, for example, as are used in electrically-propelled vehicles.

My invention is particularly adapted for use in locomotives in which high-powered internal-combustion engines are commonly used, and in the operation of which large and sudden variations in power demand occur. Such internal-combustion engines are subject to excessive wear and inefficient operation both at overload and underload conditions. Thus, for example, if such an engine is operated at overloads, the cylinder walls are subjected to excessive pressures and temperatures, which are destructive, and on the other hand when the engine is underloaded it is operating at unnecessarily high speeds causing unnecessary wear and makes inefficient use of its fuel. It is, therefore, imperative that the demand for power on the engine shall remain substantially equal to the available engine power under all conditions of locomotive operation, and remain substantially equal thereto even during sudden variations in the power required by the locomotive.

Various electrical power systems have, heretofore, been used with such engines seeking to accomplish this result. In these systems, however, the fuel or torque adjustments on the prime mover were made concurrently, or before the load adjustments of the electrical system were made, whereby the load change of the electrical system always lagged far behind the variations in the prime mover power, which resulted in underloading or overloading of the engine.

It is an object of my invention to control the load characteristics of the electric system in response to speed variations on the prime mover in such manner that the adjustments of the load of the electric system are made in response to only a small speed variation and before any substantial torque adjustments are made on the prime mover.

A further object of my invention is to control the torque of the prime mover in such manner that the adjustment of the torque is proportional to the degree of the speed variation and to control the load adjustment in response to a small speed variation which is ineffective to substantially vary the torque to compensate from this speed variation; the degree of the load adjustment being proportional to the time that the small speed variation persists.

A further object of my invention is to provide a power system in which the prime mover may be operated at any selected one of a plurality of speeds, and in which full range control of the generator excitation may be obtained at any one of these speeds to obtain the desired loading of the prime mover.

A further object of my invention is to provide a power system of this kind in which a smooth flow of power from the prime mover to the motors is effected by causing an instantaneous change of excitation of the generator at the initiation of each adjustment of the excitation, required by a speed change in the prime mover, and again instantaneously changing the excitation at the end of an adjustment of the generator excitation; the two instantaneous changes having opposite effect upon the total excitation of the generator and substantially neutralizing each other.

A further object of my invention is to provide a predetermined throttle setting for each selected speed and corresponding load on the prime mover, and to regulate the generator load in response to a smaller change in the speed of the prime mover than the speed change required to operate the throttle sufficiently to compensate for this change in the speed so as to regulate the speed of the prime mover within a predetermined range with the throttle and within a smaller range by regulation of the electrical load, whereby speed regulation of the prime mover is obtained by load regulation.

In carrying out the above objects of my invention, I provide a power system, in which the prime mover and electric translating apparatus including suitable motors and generators are under the control of a single drum controller, which makes available the full power of the system when in its last position and fractions of this power at intermediate positions.

The prime mover is provided with a governor, which is arranged to operate the throttle and to maintain the speed of the prime mover substantially constant at any one of a plurality of predetermined speeds, which are selected by the master controller.

The generator is provided with any suitable field excitation system, the current in which is regulated by resistors, which are under the control of the master controller, and an automatically-operated rheostat, which is released by the master controller after the desired connections have been made between the generator and motors.

The motors are connected to the generator in series with each other by connections controlled by the master controller, but after this connection is made the motors are also connected, when necessary, in series-parallel with full field, or reduced field, by the automatically-operated field rheostat.

The control of the automatic rheostat is obtained by control circuits which are made or broken by contacts associated with the governor. The governor operates in response to speed changes to control a contact which cooperates with a pair of stationary contacts, and these stationary contacts are adjusted with respect to the moving contact so that the generator excitation, and therefore the electrical load, are changed in response to small speed changes of the prime mover. The accompanying changes of the throttle setting on the prime mover are so small that they do not substantially effect the torque of the prime mover, and the change in torque is not sufficient to compensate for the change in speed of the prime mover. The prime mover, therefore, operates independently of load variations, as well as speed variations of the motors. The stationary contacts are further adjustable with respect to the moving contact, so that a full range of operation of the field rheostat is obtained at each one of the selected speeds of the prime mover.

The field rheostat, which is operated in response to the speed changes on the prime mover, comprises an adjustable resistor and a movable arm. The adjustable resistor is divided into three series-connected sections. One of these sections is arranged to be used during series operation of the motors; another section is used during series-parallel operation of the motors, and the third section is used during series-parallel reduced-field operation of the motors. The rheostat is provided with an arm which is arranged to traverse the contacts on the resistor in response to speed changes of the prime mover. As this arm is moved from one end of the resistor to the other, its position determines the generator excitation, and it is arranged to cooperate with a series of segments to effect the change in motor connections and the operation of the switches which shunt the rheostat sections; the motor connections being changed when the arm passes from one to the other of the above-mentioned three sections of the rheostat. The motor connections are changed when the rheostat arm passes from one to the other of the rheostat sections when the rheostat arm is moved in a direction to decrease the resistance, but when the arm is moved in the other direction to increase the resistance the connections are changed beyond these points in a direction of increased resistance, so that when the motor connections are changed the generator excitation is always less than required.

The rheostat arm is further provided with two permanently-spaced brushes arranged to contact the adjustable resistor at two spaced points, one of these brushes being normally grounded and arranged to control the generator field circuit. When the movement of the arm is initiated, the second brush is grounded by a contactor and instantly reduces the field resistance since it removes from the field circuit, resistance in circuit between itself and the first brush on the arm, and maintains this reduction in the field resistance as long as the rheostat arm is being moved. When the arm stops, this brush is disconnected from ground and the resistance between it and the other brush is again inserted in the generator field circuit. The effect of this operation is to instantly change the controlling resistance of the generator excitation system, when the speed of the prime mover indicates a need of change in the load, and to maintain this change of resistance while the rheostat arm is being moved to further change the field resistance. It will thus be seen that in the operation of the rheostat, the excitation change is anticipated by this instantaneous change which aids greatly in the adjustment of the excitation to obtain the proper smooth control of the electric load on the prime mover.

The governor of the prime mover is arranged to maintain several selected speeds of the prime mover; the selection of these speeds being made by a drum controller. In order to control the generator excitation and the motor connections in response to speed changes of the prime mover, the governor is arranged to operate a movable contact between two stationary contacts, the latter of which are given a predetermined position for each of the selected speeds of the prime mover. The operation of the movable contact is such that it initiates an adjustment of the generator excitation before any appreciable change is made in the throttle setting, and, therefore, before any substantial change is made in the torque of the prime mover. By this arrangement a change of the electric load always precedes substantial torque adjustments of the prime mover, and the load and power, therefore, change substantially concurrently.

In order to eliminate hunting the governor is provided with a coil, which is energized concurrently with the rheostat operating coil. When this governor coil is energized it counteracts the movement of the governor spindle and tends to deenergize the rheostat motor by separating the movable from the stationary contacts, associated with the governor, before a complete adjustment of the rheostat arm is made. The torque of the coil is only large enough to separate the contacts when the load and power are nearly balanced. The result of this action therefore is that the adjustment of the field excitation takes place continuously until the system is nearly balanced and then takes place by notching in a series of small steps, whereby hunting in the system is eliminated.

Further objects and advantages of my invention will be apparent, and the invention itself will be better understood, from the following description, when considered in connection with the accompanying drawing, and the features of novelty which characterize my invention will be pointed out with particularity in the claims annexed to and forming a part of this specification.

In the accompanying drawing, Fig. 1 is a diagrammatic representation of a power system embodying my invention, and Fig. 2 is an enlarged view of the governor adjusting mechanism.

Referring to the drawing, Fig. 1 illustrates a power system including a prime mover 10, which is an internal-combustion engine, although any other suitable prime mover may be employed. A generator 11 and an exciter 12 are both directly connected by a shaft 13 to the prime mover. An adjustable-field rheostat 14 is provided to control the excitation of the field exciting winding 16 of the generator 11. The prime mover is controlled by a speed-responsive governor 17, which also controls circuits arranged to energize the operating coils 20 and 21 of the rheostat 14, so as to vary the excitation of the generator as required by variations in the load. The power output of generator 11 is supplied to motors 25, 26, 27 and 28 and the whole system is under the control of a manually-operated controller 30.

*The prime mover and governor*

The prime mover is an internal-combustion engine provided with a throttle 31 to which fuel is pumped by a fuel pump 32 from a tank 33 through conduits 34, 35 and an electrically-operated fuel valve 37. The throttle 31 is of the by-pass type, which admits fuel to the fuel distributor 38, and may pass a portion thereof back to the tank through conduit 41, dependent upon the throttle setting. The throttle is operated by a rod 42 connected to one arm of a bell-crank 43 pivoted at 44, the other arm of the bell-crank being connected to the operating spindle 46 of the governor 17 through a slot and pin connection 47.

The governor 17 of the prime mover consists of centrifugally-actuated weights 50 and 51 pivoted upon a body 52, which is rotated by the engine cam shaft 53 through bevel gears 55. The weights 50 and 51 are arranged to lift the spindle 46 against the pressure of a spring 57 and thereby control the throttle 31 through the bell-crank 43. The governor may be set to hold a predetermined speed by adjusting the pressure exerted upon the spindle 46 by a second spring 60. The spring 60 rests upon the engine frame and exerts pressure against one end of a floating lever 61, the other end of which rests upon the spindle 46. A roller 62 is arranged between the lever 61 and the underside of a horizontal bracket arm 63, attached to the engine frame, and provides a pivot for the lever 61. The position of the roller 62 determines the amount of pressure the spring 60 is able to exert upon the spindle 46. The position of roller 62 is controlled by the coils 65, 66, 67 and 68 through a bell-crank lever 70 pivoted at 71, and having one arm connected to the roller 62 by a rod 72. When all the coils are deenergized the roller 62 is positioned directly above the spring 60 and no additional pressure can, therefore, be exerted by this spring 60 against the spindle 46. The engine then runs at idling speed. In order to increase the speed of the engine the coils 65 to 68 are successively energized and lift the bell-crank arm, so as to move roller 62 away from the spring 60 to the right of the spring 60, so that when coil 68 is energized the roller is in a position farthest from spring 60 which then exerts the greatest pressure upon the spindle 46, and the engine runs at its highest speed. It must be observed that the governor spindle assumes a different position at each of the selected speeds of the prime mover, and thereby maintains a predetermined throttle opening for each of these settings. With this arrangement therefore, the engine operates at considerably less than full load torque at each of the reduced speeds.

In order to control the generator 11 and the motor connections in response to speed changes of the prime mover, the spindle 46 is caused to operate a contact 75 mounted on a spring arm 75a carried by a lever 76 pivoted at 77 and connected to the governor spindle 46 by a slot and pin connection 78. The arrangement of this contact and the throttle mechanism is such that the contact is moved and closes an electric circuit before the throttle setting is changed sufficiently to effect the engine speed. In this way regulation of the electric load is always in advance of any substantial throttle changes, and the throttle setting can be varied after the contact 75 has engaged a contact 80 or 81.

The movable contact 75 is arranged to cooperate with stationary contacts 80 and 81 mounted on a plate 82, which is also pivoted at 77. The plate 82 is connected to a rod 84, the other end of which is connected to an arm of a bell-crank 86 pivoted at 87. The other arm 88 of this crank 86 is provided with a cam surface 89 which is in contact with roller 62. The movement of roller 62 towards the higher speed position rotates the bell-crank in a counter-clockwise direction against the action of spring 90 and thereby moves the contacts 80 and 81 counter-clockwise. This is necessary since, as explained above, the spindle 46 assumes a different position for each of the speeds determined by the respective settings of roller 62, and thereby moves the contact 75 to a different position at each speed setting. If the stationary contacts were not moved the range of the variation from the predetermined speed would be greater in one direction than in the other and since the contacts are spaced only a very small distance from each other they may touch and regulation would be impossible. The shape of the cam surface is therefore such that the moving contact 75 will normally be equally distant from the contacts 80 and 81 at each of the selected operating speeds of the prime mover.

The governor is further provided, in accordance with my invention, with a coil 91, which, when energized, attracts arm 92 of lever 76 and tends to turn it counter-clockwise in opposition to the action of the governor spindle. This action tends to separate contact 75 from contact 80, but does not do so until the electrical load and the power of the prime mover are nearly balanced, at which time the contacts 75 and 80 are successively opened and closed by the action of the coil 91 so that the adjustment of the rheostat takes place in a series of small successive steps, as will hereinafter be fully explained.

The operating circuit connections

The generator 11 is provided with a field-excitation winding 100 used to operate the generator as a motor in starting the engine, a commutating field exciting winding 101, and a separately-excited field exciting winding 16 which is energized by the exciter 12. The exciter 12 is provided with a field-excitation winding 102 which is excited by a battery 105 when contactor 106 is closed. This battery is also charged by the exciter through a relay 107, which is closed by coil 108 as soon as the exciter voltage is above that of the battery. For starting purposes the generator may be used as a motor by connecting the generator to the battery 105 through contactor 110.

The motors 25, 26, 27 and 28 are connected to the generator through contactor 111, and are interconnected through a series-parallel switch 112. The direction of rotation of the motors is controlled by a reversing switch 113, which changes the motor field connections as required. Contactors 115 and 116 connect resistors 117 and 118, respectively, across the fields of the motors and provide for the reduced field, high-speed operation of the motors.

The field rheostat

The field rheostat 14 is provided with a resistor having a plurality of taps 120 which are connected to the resistor at such intervals as is found necessary to give the proper control. Thus in the present case, for example, the actual amount of resistance between the taps is the same within one group but is different in each of the groups. This rheostat is grounded at one end and further divided into three series-connected parts by taps 121, 122 and 123. The part between ground and tap 121 is used during series operation of the motors, the part between taps 121 and 122 is used during series-parallel operation of the motors, and the part between taps 122 and 123 is used during series-parallel reduced-field operation of the motors.

The rheostat is provided with an operating arm 125, which carries brushes 126 and 127 arranged to engage the taps 120. Brush 126 is constantly grounded and brush 127 is grounded by a contactor 128 when it closes. Another grounded brush 130 is arranged to cooperate with segments 131 to 138, as the arm moves along taps 120, the segments 131 to 138 being connected to the operating coils of switches, or contactors, for changing the motor connections and effecting corresponding generator field excitation changes. The operating coil 20 causes the arm 125 to move towards the left end of the resistor, and may for convenience be called the "advance" coil, and the operating coil 21 causes the arm 125 to move towards the right, or grounded end of the resistor, and may for convenience be called the "return" coil. The position of the arm, as shown in the drawing, is what may be termed the "rest" position. In this position sufficient resistance is cut out of the field circuit to enable the generator field to be quickly increased when the locomotive is running under light load. If, however, a heavy load is placed on the locomotive, the arm 125 may be moved to increase the field resistance and thereby prevent an overload on the prime mover.

*The control circuits*

The control circuits, as illustrated in Fig. 1, may best be explained by following the sequence of operations which an operator must necessarily perform from the first starting operation to the movement of the controller to its last position, that is the full power position, and to point out the circuits established by each operation and movement of the master controller.

In order to obtain power available for driving the locomotive, the prime mover must be started. For this purpose manually-operated switches 142, 143, 144 and 145 are provided. Switch 142 must first be closed to provide current for the control circuit and these control circuits prevent the rheostat arm 125 from returning to the limit of its movement, or in other words beyond the rest position, until after the prime mover is operating at a predetermined speed. The switch 143 is next closed and causes the generator to operate as a motor to turn the prime mover until it is started, and is then opened. Switch 144 is then closed to connect the exciter field winding to the battery and thereby prepare the exciter for connection to the generator field exciting winding. The switch 145 is merely provided for stopping the engine and is in circuit with the operating coil of the fuel shut-off valve.

The circuits for the switch 142 may be traced from battery 105 through the normally-closed disconnecting switches at each end of the battery, conductors 140 and 141 to switch 142. This switch is closed and remains closed during the operation of the system. From switch 142 current flows through the conductors 146 and 147 to the operating coil of a contactor 150, conductor 151, segment 131, brush 130 to ground. When the operating coil of the contactor 150 is energized it causes the contactor to close its contacts and establish a circuit to ground for a conductor 148. This does not affect the rheostat circuits at this time, however, since that conductor 148 is grounded through conductor 149, segment 132 and brush 130. This contactor 150 simultaneously opens its normally-closed interlock and breaks the circuit from conductors 146 and 147 to conductor 152 and the return coil 21. The rheostat arm can, therefore, not now be moved by the return coil 21 beyond the rest position at which it is shown in the drawing.

The starting switch 143 is then closed until the prime mover is brought up to speed and fires its fuel charges to operate under its own power. The starting circuit may be traced from the conductor 146 through the switch 143, conductor 153, normally-closed interlock of a contactor 154, conductor 156, normally-closed interlock of contactor 111, operating coil of contactor 110 to ground. Contactor 110 thereupon closes and completes a circuit from battery 105, conductor 140, starting field exciting winding 100, conductor 157, contactor 110, conductor 159, armature of the generator 11, commutation winding 101 to ground. The motor then turns the engine until it is at a speed at which its fuel ignites and then operates under its own power. The switch 143 is then opened and contactor 110 opens to break the circuit between the battery and the generator. It must be noted here that when the contactor 110 closes, it closes its normally-open interlock and establishes a shunt about the oil pressure switch 158, which is open until the engine operates at firing speed and oil pressure is built up in the system to close the oil switch. The closing of the oil switch 158, or the shunt around it through conductors 139 and 160 and the interlock on the contactor 110, establishes a circuit through the fuel valve operating coil and opens the valve. These circuits may be traced from battery 105, conductors 140 and 141, switch 145, conductor 161, operating coil of the fuel valve 37, contacts of the oil pressure switch 158, and then conductors 160 and 162 and over-speed switch 163 to ground, or conductor 139 normally-open (now closed) interlock of contactor 110, conductors 160 and 162, switch 163 to ground. If it is desired to stop the prime mover the switch 145 need merely be opened. The fuel valve 37 closes as soon as its operating coil is thus deenergized and the prime mover stops due to lack of fuel.

After the prime mover is operating under its own power, switch 144 is closed. The closing of this switch establishes a circuit to the exciter field contactor 106, and causes it to open the field discharge circuit and connect the field-exciting winding 102 to the battery. The circuit may be traced from conductor 146, switch 144, operating coil of contactor 106, conductors 164, normally-open (now closed) interlock on contactor 150 to ground. When contactor 106 operates, it closes its normally-open interlock and establishes a locking circuit to ground for its own operating coil. The contactor 106 remains closed, therefore, irrespective of the operation of the contactor 150. The discharge circuit, which is opened when the contactor coil is energized, may be traced from ground through discharge resistor 165, contactor 106, conductor 166, field exciting winding 102, carbon pile resistor 167 to ground. At the same time the winding 102 is connected to the battery 105 through conductor 166, contactor 106, conductors 168, 141 and 140. A coil 170 is connected to conductor 171, which is connected to the high potential side of the exciter 12, and to ground. It is, therefore, energized in proportion to the potential across the exciter and is arranged to regulate the pressure on the carbon pile resistor 167 to maintain a constant voltage across the exciter.

After the prime mover is started, the rheostat arm remains in its rest position, at which brush 130 engages both segments 131 and 132, and the exciter field excitation winding is connected to the battery, as above explained. The control of the whole system is then obtained by operation of the main controller drum 30, and the associated motor reversing drum 172 of the usual type, which may be operated to cause a forward or reverse movement of the vehicle. The drum controller 30 is of the well known type and is arranged to be operated from an off position, shown in the drawing, through eight positions, to the full power position.

At the first position of the controller the prime mover is operated at its idling speed of 250 R. P. M., and the controller establishes a circuit to the control circuits of the reversing switch 113 and causes it to make the proper motor field exciting winding connections in accordance with the setting of the reversing drum. When this proper connection is made, a circuit is established to the contactor 111, which then connects the motors to the generator. This in turn establishes a circuit to the contactors 154 and 155, which are operated to connect the generator field 16 to the exciter.

The resistance in circuit with the field exciting winding 16 at this time is only that portion of the field rheostat arranged between tap 122 and the brush 126, the remaining resistance being shunted at this time. The power transmitted to the motors is comparatively small since the prime mover is still operating at its idling speed, which in the present case is approximately 250 R. P. M.

When the controller is moved to its second position, the speed of the prime mover is increased to 325 R. P. M. and since the generator and motor connections remain unchanged the power transmitted to the motors is correspondingly increased.

At the third position of the controller, the prime mover runs at 325 R. P. M., and the generator field excitation is increased by shunting the series-parallel section of the field rheostat by closing contactor 173 and inserting into the field excitation circuit the resistors 174 and 175 by opening contactors 177 and 178.

At the fourth position of the controller, the speed of the prime mover remains at 325 R. P. M., and the contactor 178 is again energized to shunt resistor 175 and thereby again increase the excitation of the generator.

At the fifth position of the controller, the prime mover operates at 325 R. P. M., and the field rheostat 14 is released from its rest position, for automatic operation, by placing the operating coils thereof under the control of the governor contacts 75, 80 and 81. From the second to this fifth position of the controller, the prime mover has been operating at 325 R. P. M., having only the first coil 65 of the governor throttle regulating mechanism energized. When the controller is moved to its sixth, seventh and eighth positions, the coils 66, 67 and 68 are successively energized, and the speed of the prime mover is increased accordingly to 365 R. P. M., 400 R. P. M. and 500 R. P. M., respectively. The regulation of the generator field excitation and the motor connections are then controlled solely by the field rheostat 14.

The circuits established at each position of the main controller 30 will now be traced. When the main controller is moved to its first position, assuming a forward, "F", setting of the reversing drum 172, current from the battery 105 flows through conductors 140 and 141 to switch 142 (now closed) to conductors 146 and 179 through controller segments 180 and 181, conductor 182, segment 183, conductor 184, operating coil F of the motor field-reversing switch 113, and to ground so as to connect the motor fields for forward operation. This switch may be of any suitable type. Its function is to change the motor field connections, so that the motors will rotate in the proper direction. It is provided with two operating coils F and R, which, when energized, operate the switch to assume the respective "Forward" or "Reverse" positions.

When the main controller 30 is in its first position, current will flow from battery 105 through conductors 146 and 179 to the operating coil of contactor 178, conductors 83 and 85 and through controller segments 185 and 186 to ground. The contactor 178 is thereby closed, and shunts field resistor 175 connected in the generator field circuit. In this first position of the main controller, current also flows from the battery through controller segment 187 to conductor 188, and operating coil of contactor 177 to ground. Contactor 177 thereby closes and establishes a shunt around field resistors 174 and 175, which are not required when the prime mover is operating at this speed. Current also flows from the battery to the controller and reversing-drum segments, as previously described, to conductor 184, interlock 190 (now closed) on the reversing switch, conductor 191, normally-closed interlock on contactor 110, to operating coil of contactor 111, conductor 164, normally-open (now closed) interlock on contactor 150, to ground, which closes contactor 111.

The closing of contactor 111 establishes a circuit from the generator 11 to the motors 25 to 28, inclusive, by a circuit through conductor 159, contactor 111, conductor 192, motors 25 and 26, field-reversing switch 113, series-parallel switch (now in series "S" position), motors 27 and 28, and the reversing switch to ground.

When contactor 111 closes it also closes its normally-open interlock contacts and thereby establishes a circuit for the operating coils of contactors 154 and 155, which connect the exciter to the generator field and opens the circuit in the field discharge resistor. This circuit may be traced from the main controller 30 to reversing drum 172, conductor 184, field-reversing switch interlock 190, conductor 191, conductor 189, normally-open interlock (now closed) on contactor 111, conductor 193, interlock 195 on series-parallel switch 112, conductor 196, normally-closed interlock on contactor 116, conductors 197 and 198, normally-closed interlock on contactor 200, conductors 201 and 202 through the operating coils of contactors 154 and 155, in multiple, to ground. When contactor 154 closes, it connects generator field exciting winding 16 to the exciter 12 through conductors 171 and 203. When the contactor 155 opens, it merely opens the field-discharge circuit, including conductor 203, contactor 155, field-discharge resistor 204, conductor 205, and the field 16. When this discharge circuit is opened, the conductor 205 is grounded through the series-connected resistors 174, 175 and part of rheostat 14; the resistors 174 and 175 being shunted at this time. It is to be noted that the adjustable resistor 14 is not fully in the circuit at this setting of the main controller.

The section thereof lying between taps 122 and 123, which is the section used during series-parallel and reduced-field operation of the motors 25 to 28, is shunted by the normally-closed contacts of contactor 206.

With this arrangement of the switches and contactors obtained in the first position of the main controller, the operation of the system may be briefly stated as follows: The prime mover is running at idling speed which may be, for example, 250 R. P. M. The generator is connected to the motors, which are in series with each other, and the generator field exciting winding is connected to the exciter having only in circuit the series-parallel section section of the adjustable resistor, and a part of the series section thereof, the remaining resistance being shunted at this time.

When the main controller is moved to its second position, the segment 207 makes contact and allows current to flow through conductor 208 to coil 65 of the prime mover throttle. This coil is thereby energized and pushes roller 62 towards the right. The spring 60 then exerts a force upon the governor spindle 46, which pushes the spindle down and opens the throttle 31 a predetermined additional amount. When the prime mover speeds up the weights 50 and 51 raise the spindle and a balance is reached at a higher speed, such as 325 R. P. M. for example, but at a lower position of the spindle 46 and an intreased throttle opening.

The cam 89 also moves the plate 82 counter-clockwise and establishes a new range in which contact 75 may operate. This operation results in more available torque and therefore more power at the prime mover.

When main controller 30 is moved to its third position, controller segment 208 makes contact with its contact finger and allows current to flow through conductors 210 and 211 to the operating coil of contactor 173. From this operating coil, current flows to ground through conductor 148 and contactor 150. The closing of contactor 173 establishes a shunt around the parts of the adjustable resistor lying between taps 121 and 123, which are the series-parallel and the reduced-field sections of the resistor.

In this third position of the main controller, segments 185 and 187 move out of engagement with their respective contact fingers, whereby the circuits through the operating coils of contactors 177 and 178, respectively, are broken and the contactors are opened. As a result the resistors 174 and 175 having a lower resistance than that shunted by contactor 173, are reinserted in the field circuit, to slightly decrease the field resistance of generator 11. The total resistance in circuit with the field of the generator is thus decreased, because the arm 125 of the adjustable resistor is still held in its rest position by contactor 150, and the field resistors 174 and 175, and a part of the series section of the adjustable resistor are in circuit with the field-exciting winding 16. At this position of the controller the prime mover is still running at 325 R. P. M., but the field excitation has been rearranged to impose a slightly higher generator load on the prime mover.

When the main controller is moved to its fourth position controller segment 212 again completes the operating coil circuit of contactor 178 and thereby shunts resistor 175, whereby the generator excitation and consequently the load on the prime mover is again increased.

When the main controller is moved to its fifth position, controller segments 214, 215 and 216 make contact with their respective contact fingers and segment 212 breaks its circuit to contactor 178. Contactor 178 then opens but the resistance 175 is not inserted into the generator field circuit because segment 214 energizes conductor 188 before segment 212 breaks its circuit to contactor 178 and contactor 177 is again closed, which shunts both resistors 174 and 175.

In this fifth position of the main controller, segment 215 makes contact with its finger and causes current to flow in conductor 217, operating coil of contactor 128, conductors 218 and 219, normally-open (now closed) interlock of contactor 154, conductor 221 and over-speed contact 80. This places contactor 128 in readiness for operation by grounded contact 75, which is moved by the governor spindle. If the prime mover exceeds its speed of 325 R. P. M., the contactor 128 is energized and instantly decreases the resistance in series with the generator field 16 so that there is a rapid increase in generator excitation by cutting out the resistance between brushes 126 and 127. This circuit may be traced from ground through contactor 128, conductor 222, segment 124 to brush 127.

When the contactor 128 closes, it also closes its normally-open interlock, and thereby energizes the operating magnet 20 of the adjustable rheostat 14 and causes the rheostat arm 125 to move to the left. This circuit includes segments of the main controller 30 and the reverse drum, interlock 190 of the reversing switch, conductor 191, conductor 189, normally-open (now closed) interlock of contactor 111, conductor 193, interlock 195 on series-parallel switch 112, conductor 196, normally-closed interlock on contactor 116, conductor 197, interlock of contactor 128, conductor 223, advance coil 20 of the rheostat-operating motor and ground.

The operating motor may be of any suitable type such as illustrated in U. S. Patent 1,871,472, to Sawyer, in which electrically-operated valves are arranged to admit fluid under pressure to opposite ends of a cylinder in which a piston may be operated in one or the other of two directions dependent upon the operation of the valves; the piston being mechanically connected to a switch arm or rheostat arm. In Fig. 1 of this application only the actuating coils of the valves of the operating motor are illustrated, and it is to be understood that when coil 21 is energized, the operating motor moves the rheostat arm towards the right end of the resistor to increase generator field resistance, and that when coil 20 is energized the operating motor advances the rheostat arm towards the left end of the resistor to decrease generator field resistance. Movement of the arm in each instance stops as soon as the coils are respectively deenergized.

Whenever the interlock on contactor 128 is closed, the governor coil 91 is energized. When this coil is energized its armature exerts a force upon the governor spindle 46 tending to force it into its original position and also tends to separate the contacts 75 and 80. The force exerted, however, is such that the contacts are not separated until the rheostat arm and therefore the generator excitation has been adjusted to nearly proper value. The contacts then separate and reclose and the contactor 128 is closed and opened successively to produce a step-by-step, or a notching movement of the rheostat arm 125. This circuit may be traced from the interlock of contactor 128 to conductor 223, to the normally-closed interlock of contactor 178, to conductor 224, through the governor coil 91 to ground.

At this fifth position of the controller, the segment 216 also makes contact with its contact finger and establishes a circuit from the battery to conductor 152, the return coil 21 of the adjustable rheostat, conductor 156 and to underspeed contact 81. If the speed of the prime mover then decreases, the contacts 75 and 81 are closed, which energizes the return coil 21, so as to return the rheostat arm beyond its rest position to decrease the excitation of the generator 11. This reduces the load on the engine and its speed increases to 325 R. P. M. The connections at this fifth position of the controller, therefore, permit automatic operation of the rheostat by energizing conductor 152 and maintaining the energization of coil 65 which causes the operating speed of the prime mover to be maintained at 325 R. P. M.

At the sixth position of the controller, segment 227 energizes conductor 228 and the throttle coil 66. The speed of the engine is thereby increased, in the manner already explained, to 365 R. P. M. All of the other electrical connections remain the same and the excitation of the generator 11 is controlled by automatic operation of the rheostat 14 in response to prime mover speed, as when the controller was in its fifth position. Moreover, this automatic control of the generator excitation is also obtained in the seventh and eighth positions of the main controller 30.

At the seventh position, the segment 230 causes current to flow through conductor 231 to throttle coil 67 and the speed of the engine increases to 400 R. P. M. Segment 216 breaks the circuit to the rheostat return coil 21 which it had established through conductor 152 in positions 5 and 6, and the conductor remains connected to the battery only through the normally-closed interlock on contactor 150.

At the eighth position of the controller, the segment 232 causes current to flow through conductor 233 to throttle coil 68 to ground. The speed of the prime mover is thereby raised to 500 R. P. M., and at this speed furnishes the maximum power.

Operation

I have explained above how the prime mover is started and how the control of the system is thereafter transferred to the main controller. The control circuits and a part of the operating circuits have also been traced and explained. I will now explain the operation of the system assuming the controller being moved from its off position through its intermediate positions to the full power position.

When the controller drum is moved to its first position, the generator exciting field is energized and the generator is connected to the motors, which are then in series relation to each other. The prime mover is operating at its idling speed, which is 250 R. P. M. in the present construction, and with the excitation system arranged as explained, the force transmitted to the driving wheels is approximately equal to one-sixth of the total weight of the locomotive. At the second and third positions of the controller, this force is increased to one-fourth and one-third of the locomotive weight, respectively. If the locomotive is not started in the third position of the controller, the wheels may slip. If the locomotive does start, the controller can be advanced through the fourth to the fifth position and the rheostat 14 is released for automatic operation, as has been explained above. It may be stated that the particular position of the main controller, at which the automatic operation of the rheostat begins may be varied as desired. In the present case automatic operation begins after the system is arranged to furnish the maximum power necessary to start the locomotive moving.

If at this fifth position of the controller the load causes the prime mover to decrease in speed, the contact 75 engages contact 81 and a circuit is established for the rheostat return coil 21. This circuit may be traced from controller segment 216, conductor 152, coil 21, conductor 156, contacts 81 and 75 to ground. The rheostat arm will thereby move toward the left and insert more resistance into the field and decrease the load until the prime mover again regains its normal speed for this position of the controller. This arrangement produces a very flexible control for locomotives. If the locomotive is heavily loaded the controller is ordinarily advanced slowly so that the controller drum remains in each position for a substantial period of time. In the present arrangement if the controller remains in the fifth position and the locomotive is heavily loaded, the rheostat arm has sufficient time to return to the full resistance position. If, however, the locomotive is only slightly loaded, the controller is advanced rapidly over the fifth and sixth positions and the rheostat arm is caught at the "rest" position and is actually advanced whereby a rapid increase of the generator excitation is obtained and therefore a rapid locomotive acceleration.

As soon as the vehicle, or locomotive, begins to move, the generator current is reduced, due to the counter-electromotive force generated in the motors and the load on the prime mover is correspondingly reduced allowing the prime mover to gain speed. The contact 75 is then lowered, by the rising governor spindle, and engages contact 80. A circuit is thereby established including contactor 128, rheostat advance coil 20 and governor coil 91. The contactor circuit may be traced from controller segment 215, conductor 217, operating coil of the contactor 128, conductors 218 and 219, normally-open (now closed) interlock of contactor 154, contacts 80 and 75 to ground. A condenser 129 is connected in shunt to coil 128 to reduce sparking at the contacts and to enable this contactor to operate more quickly.

When contactor 128 closes, it closes its interlock and establishes a circuit for the rheostat advance coil 20 and the governor coil 91. These circuits may be traced from conductor 202, which is now energized, so as to hold field contactors 154 and 155 closed, to conductor 201, normally-closed interlock of contactor 200, conductors 198 and 197, contactor interlock 128 to conductor 223, and rheostat coil 20 to ground. The other circuit to the governor coil may be traced from conductor 223, normally-closed interlock on contactor 178, conductor 224, governor coil 91 to ground.

The result of this operation is that brush 127 is instantly grounded by the contactor 128 through segment 124 and conductor 222, whereby the resistance between brushes 127 and 126 is instantly cut out of the generator field circuit. The actual amount of resistance that is cut out of the circuit varies in accordance with the position of the rheostat arm. This is due to the fact that in arranging the taps 120 on the resistor the actual resistance between taps differs for each group of contacts on the rheostat sections so that proper control may be obtained. This arrangement provides a better regulation than if a predetermined resistance were cut out at each movement of the rheostat arm irrespective of the position thereof. Simultaneously the arm 125 also moves to cut out additional resistance and the governor coil 91 tends to break the circuit to itself, the coil 21, the operating coil of contactor 128 and tends to push the spindle 46 into its original position.

Under normal operating conditions, the result of these operations is that the generator excitation will be rapidly changed by the brush 127 and gradually changed an additional amount by the movement of the arm. In this manner I offset the lag in response to increase in current of the field excitation winding and compensate for the stored energy of acceleration in the moving parts of the prime mover and parts connected thereto, so that when the rheostat arm reaches its final position the electrical load will exactly balance the available power of the prime mover. The governor coil will break the circuit before full adjustment is obtained, the brush 127 will be deenergized and the net change in the field resistance will be the amount caused by the movement of the rheostat arm. This net amount is generally not enough to compensate for the change in the load and a rapid series of the described adjustments takes place. The governor coil will permit, as already explained, a continuous movement of the rheostat arm until the proper adjustment is nearly made. Its torque is then sufficient to break the circuit between the governor contacts whereby the brush 127 and the advance coil 20 are deenergized. A series of rapid additional adjustments then follow which taper off until the exact balance between load and power is reached. This operation is very desirable since the adjustment may be stopped at any one of these small increments, or steps, and there is no danger of overcorrection in this operation, and as a result forces tending to cause hunting of the rotating apparatus are eliminated.

As above stated, the governor coil is able to separate the contacts 75 and 80 under normal variations of power. If there are large variations the coil 20 remains energized and causes the rheostat arm to move until the adjustment is nearly correct and the above-described interrupted operation, referred to as notching, continues until the proper adjustment is made.

Assuming that the vehicle is gaining speed and the current is diminishing, due to the rising counter E. M. F. in the motors. The total load on the prime mover would necessarily diminish if there were no change in generator excitation. In order to maintain the original load on the prime mover, the rheostat arm is advanced, in the manner just described, toward the left end of the resistance. When the vehicle was started, brush 130 of the rheostat arm was in contact with segment 131. As the arm begins to advance toward the left, brush 130 leaves segment 131 and interrupts the circuit to the operating coil of contactor 150. This circuit of this contactor includes controller segment 180, conductors 179, 146 and 147, operating coil 150, conductor 151, segment 131, brush 130 to ground. The result is that contactor 150 opens its contacts, and thereby breaks the circuit to ground through conductor 148. The breaking of the circuit does not affect the system at this time, since conductor 148 is now grounded through rheostat segment 132 and brush 130. The contactor 150 also closes its normally-closed interlocks and establishes a circuit from controller segment 180, through conductors 179, 146 and 147, interlock contactor 150, conductor 152, return coil 21, conductor 156 to underspeed contact 81. At positions 5 and 6 of the controller, this circuit does not affect the system since current flows to conductor 152 from controller segment 180. At all other positions of the controller drum, however, this operation places the coil 21 under the control of the governor contacts when the rheostat arm is in this position.

The contactor 150 also opens its normally-open interlock contacts at this operation and breaks the connection of conductor 164 to ground at this point. This operation is also of no effect at this time, since the conductor 164 is grounded through the normally-open (now closed) interlock of field contactor 106. The transition of brush 130 from segment 131 to 132, when the main controller is at position five, merely opens contactor 150, but has no effect on the position of the other contactors.

As the brush 130 advances to segment 133, the ground connection of conductor 148 through segment 132 and brush 130 is broken, but the contactor 173 remains closed since current flows to ground from the operating coil through normally-open (now closed) interlocks on the contactor 173, conductor 235, segment 133 and brush 130.

When the brush 130 leaves segment 133 and passes to segment 134, however, the contactor 173 opens and establishes a circuit through its normally-closed interlock for the operating coils of the series-parallel switch, whereby the series motor connections are changed to series-parallel. This is due to the fact that as brush 130 leaves segment 133, the ground connection of conductor 235 is broken and the operating coil of contactor 173 is deenergized. This contactor 173 then opens, opens the shunt circuit around the series-parallel and series-parallel reduced-field sections of the rheostat, that is, between taps 121 and 123, and simultaneously closes its normally-closed interlock and establishes an energizing circuit for the operating coils 236 and 237 of the series-parallel switch 112. The circuit may be traced from controller segment 215, conductors 217 and 238, interlock on contactor 173, conductor 239, operating coils 236 and 237 on the series-parallel switch 112 to ground.

The energization of the coils 236 and 237 merely throws the switch 112 from the position marked "S" to the position marked "SP". The result of this operation is a change of the motor connections from series to series-parallel. The circuits may be traced from the generator armature 11, conductor 158, contactor 111, conductor 192, motor armatures 25 and 26, field-reversing switch 113, and the fields of the two motors, conductor 226, series-parallel switch to ground. The current also flows from conductor 192 to the operating coil of over-current relay 240, conductor 241, series-parallel switch 112, conductor 203, motors 27 and 28, field-reversing switch 113 to the motor field exciting windings, back to switch 113 and to ground.

If too high a current flows to the motors, relay 240 closes its contacts and establishes a circuit for the contactor coil 200. This circuit may be traced from controller segment 208, conductor 210, operating coil of contactor 200, conductors 242 and 243, to contacts of relay 240 and ground. When contactor 200 closes, it grounds conductor and energizes the return coil 21 to reduce the generator excitation.

The opening of the contactor 173, due to brush 130 passing onto segment 134, as has just been explained, removes a shunt connection between taps 121 and 123 of the rheostat, but inserts only the series-parallel section of the resistor between taps 121 and 122 into the field circuit, because the reduced field section, between taps 123 and 122, is at this time shunted by the normally-closed contacts of contactor 206. The series-parallel section of the resistor is, however, designed to give an excitation, which is slightly less than required so that the arm 125 will be advanced to obtain proper excitation rather than returned.

The generator field circuit is also interrupted momentarily to prevent an overload of the prime mover during this transition. As the series-parallel switch is moved from the "S" to the "SP" position, the interlock 195 momentarily breaks the circuit between conductors 193 and 196, whereby the operating coils of field contactors 154 and 155 are deenergized. When contactor 154 opens, the interlock on this contactor 154 also breaks the circuit between conductors 219 and 221, whereby the rheostat advance coil 20 and the governor coil 91 are deenergized. This operation momentarily reduces the excitation of the generator, stops the arm of the rheostat and permits reestablishing of motor connections in the series-parallel relation to be made at practically residual generator voltage. The field circuit is, however, reestablished as soon as the new motor connections are made and the rheostat arm is permitted to advance as the generator current continues to diminish with increased speed of the locomotive, through the control circuits traced above.

If the locomotive continues to accelerate, the current diminishes and the rheostat arm continues to advance under the control of the governor contacts 75 and 80, to the left to increase the generator' excitation. As the arm progresses, brush 130 grounds segments 135 and 136, and when the brush reaches segment 137, the motor field shunting contactors 115 and 116 are energized, and respectively connect resistors 117 and 118 in multiple with the motor fields. This circuit may be traced from controller segment 208, conductors 210 and 245 to the operating coils of the contactors 115 and 116, to conductor 246 to the segment 137 and through brush 130 to ground. When the conductor 246 is grounded through the brush 130, contactor operating coil 206 is energized and opens its contacts. This opens the shunt circuit around the reduced-field section of the rheostat 14, that is, the section between taps 123 and 122 of the resistor. The circuit for the operating coil of contactor 206 may be traced from controller segment 208, conductors 210 and 211, operating coil 206 to conductors 247 and 246, segment 137, brush 130 to ground.

The insertion of the reduced-field section of the rheostat into the field circuit of the generator reduces the excitation to a value slightly less than is needed and the rheostat arm will advance slightly to the proper value after this operation. The change in excitation at this transition is small and it is not necessary to open the generator field circuit, as was necessary during the transition from series to series-parallel.

If the load on the prime mover is still too small, arm 125 may advance until brush 130 engages segment 138 and leaves segment 137. The ground on conductor 246 is thereby broken but contactor operating coils 206, 115 and 116 remain energized, since conductor 85 is grounded. The grounding of conductor 184 completes a circuit through the contactor operating coil 178 which closes its normally open interlock and thereby grounds conductor 246 again. The circuit may be traced from conductor 246 to conductor 247, interlock on contactor 206 (now closed), conductors 252, 251 and 256, interlock 195, conductor 255, normally open (now closed) interlock 178 to ground. The closing of contactor 178 opens the normally-closed interlock thereon and breaks the governor coil circuit. This prevents the depression of the governor spindle when the rheostat arm is on the last contact of the rheostat.

The operation of the various controlling circuits upon movement of the rheostat arm up to the segment 138 has been explained with the main controller in its fifth position, assuming a gradual increase of the locomotive speed, a corresponding reduction in generator current, and a constant load on the prime mover. Now assuming that with the main controller still in the fifth position, the locomotive ascends a grade and gradually loses speed. The generator current, and therefore, the load on the prime mover with immediately increase and contact 75 will correspondingly engage underspeed contact 81 and energize the return coil 70 of the rheostat, as has been explained. This will cause the arm 125 to return, and insert resistance of the rheostat in the generator field circuit, and also cause brush 130 to leave the segment 138 and again engage segment 137. This operation deenergizes contactor 178 which then closes its normally-closed interlock to reestablish the circuit to governor coil 91 from conductor 223. When the brush 130 leaves segment 137, however, and engages segment 136, the motor field reducing contactors 115 and 116 will remain closed and the generator field resistance shunting contactor 206 will not close, since a circuit is established to ground through brush 130, segment 136, conductors 251 and 252, normally-open interlocks (now closed) on contactor 206, conductor 247, back to conductor 246. The reduced field connection is thereby maintained until the rheostat arm moves beyond the point at which the reduced-field connection was established. This arrangement provides a gap between the point at which the reduced-field is established and the point at which it is broken, so that when the connection is once made considerable movement of the rheostat arm back over this point is permissible without making and breaking of these motor connections whereby a smooth control of the load on the generator is obtained.

When brush 130 returns to segment 135, the contactor 200 is energized and closes its contacts. The operating circuit may be traced from ground through brush 130, segment 135, conductor 249, normally-open (now closed) interlock on contactor 115, conductor 242, operating coil of contactor 200, conductor 210 to controller segment 208. Closing contactor 200 in this way grounds conductor 156, so that return coil 21 is energized irrespective of the position of the governor contacts acting through conductor 156, and the arm 125 is forced back until brush 130 leaves this segment 135. The normally-closed interlock on this contactor breaks the circuit to the advance coil 20, so that this coil cannot be energized during the transition, while the normally-open (now closed) interlock on this contactor again establishes a holding circuit for the field reducing contactors 115 and 116 and the contactor 206. This circuit may be traced from ground through brush 130, segment 135, conductors 249, normally-open (now closed) interlock on contactor 115, conductor 242, normally-open (now closed) interlock on contactor 200, conductor 255, interlock 195 on the series-parallel switch, conductor 256 and conductor 251 to which segment 136 is connected. The closing of the normally-open interlock on contactor 200, therefore, transfers the control of the contactors 206, 115 and 116 to segment 135, and maintains them in their energized position. The important function of the segment 135 and contactor 200 on the return movement of the rheostat arm is, therefore, to force the arm back for the full length of this segment 135 irrespective of the governor contact operation.

When the rheostat arm is forced back, as just explained, far enough for brush 130 to leave segment 135, the energizing circuit for contactors 200, 206, 115 and 116 is broken, which causes contactors 200, 115 and 116 to open and causes contactor 206 to close. The result is that the series-parallel full-field connection of the motors is reestablished, with considerably reduced load on the prime mover, and the rheostat arm is again permitted to advance under control of the contacts 75 and 80 on the governor to maintain the proper load and speed of the prime mover. The reduced-field connection is not reestablished, however, should the arm continue to advance, until the brush 130 reaches segment 137, as has been explained.

As above stated, the change of motor connections does not take place at the same point for both directions of movement of the rheostat arm. When the arm is moved to increase the excitation, the motor connections are changed when the brush 130 reaches segment 137, which is at a point calculated to produce an excitation which is below that which is actually required, and thereby prevent an overload on the engine with the reduced-field connection of the motors. When the arm is moving in the return direction, however, a reestablishing of these motor connections at that same point might cause sudden successive changes in these motor connections. The rheostat arm is, therefore, caused to move back when decreased load is necessary over the segment 136 under control of the governor overspeed contact 80, but when it reaches segment 135 it is forced back across this segment irrespective of the governor contact operation and the full field connection is reestablished when the brush 130 leaves segment 135, which is at a point on the rheostat giving a greater difference between the actual and required generator excitation than the difference existing at the time the reduced field connections were made during the advance movement of the rheostat arm. This provides a stable and smooth operation of the system in making the changes in the motor connections without overloading the prime mover with either increasing or decreasing load.

If the current in the motors should further increase, the rheostat arm is returned until brush 130 engages segment 133. During the advance movement the series-parallel connection was established when the brush 130 left segment 133. The series connection is, however, not reestablished when the brush reengages this segment upon its return movement, since the normally-open interlock of contactor 173 is now open and conductor 235, which is connected to segment 133, is disconnected from the operating circuit of the series-parallel switch.

When brush 130 reaches segment 132 on its return movement, contactor 173 is again energized and establishes a shunt around the series-parallel and reduced-field portions of the rheostat and opens the normally-closed interlock of contactor 173 to break the operating circuit of the series-parallel switch and reestablish the series connection of the motors. This causes the interlock 195 on the series-parallel switch to again interrupt the operating circuit of contactors 154 and 155 during this transition and the motor connections are changed during substantially residual voltage on the generator, as was the case when the series-parallel connection was established. In this case again, the reestablishing of the series connection is accomplished when the brush 130 is at a point spaced from the point at which the series-parallel connection was made.

It may be noted here that as the locomotive continues to decelerate, the current in the generator and the motors will rise to a value at which it will cause no further increase in the load on the prime mover and the governor contacts will therefore cause the rheostat arm to move in a reverse direction to maintain constant the load on the prime mover, or to maintain the load equal to the power of the prime mover. In order to insure a return movement of the rheostat arm to the segment 132 therefore, the over-current relay 240 is set to operate at a value which is considered safe for the motors and the generator and at which it will cause the rheostat arm to move toward the high resistance end of the resistor, in the manner which has been explained above, until it reaches the segment 132 and thereby causes the motor connections to be changed. When the connections are completed, the current will immediately diminish, and the rheostat arm will again advance to increase the generator excitation to maintain the speed of the prime mover constant.

This arrangement is necessary due to the inherent characteristics of some generators in which an increase of current beyond a certain value does not increase the load but actually decreases the load. If generators not having this characteristic are used the relay 240 need only be arranged as an over-current relay.

If the rheostat arm 125 is returned far enough to engage segment 131 again, the contactor 150 is closed and breaks the energizing circuit to return coil 21 on the rheostat, by opening its normally-closed interlock. While the main controller is on either its fifth or sixth position, this interruption of the circuit to coil 21 is of no effect since the conductor 152 receives current through the controller segment 216. But in other positions of the controller, the effect is to maintain rheostat arm in this, the "rest", position so that when the locomotive is started with a light load the generator excitation will be built up more rapidly and the consequent acceleration of the locomotive will be greater than it could be if the rheostat arm were forced into the full resistance position and were required to move this additional distance to build up the generator excitation.

I have now traced the operation of the system when the main controller is in the fifth position. When the controller is moved to the sixth, seventh and eighth position, the speed of the prime mover, and therefore its power is gradually increased by successively energizing coils 66, 67 and 68. The rheostat operates in substantially the same manner in the fifth, sixth, seventh and eighth positions of the main controller, except that the return coil 21 is not energized through the controller segment 216 in the seventh and eighth positions, but receives current through the normally-closed interlock contacts of contactor 150.

It must be noted, however, that when the controller is first moved to the sixth, seventh and eighth positions, respectively, the spindle 46 is immediately depressed by the action of lever 61 and spring 60, whereby a circuit is established between contacts 75 and 81 for the return coil 21 and the rheostat arm is moved to increase the field resistance and reduce the load on the generator, while the prime mover is gaining speed. This action gives the prime mover an opportunity to quickly increase its speed to that which is required for increased power, after which the rheostat arm is again advanced to the proper position to load the prime mover and maintain it within the desired range of speed. This is another feature tending to give a smooth flow of power from the prime mover to the motors.

It will furthermore be evident from the foregoing description that the torque adjusting means is an ordinary throttle valve whose movement is dependent upon the degree of the speed variation so that the torque adjustments are proportional to the degree of the speed variation. The load adjustments are however made by the rheostat whose operation is initiated by the governor contacts which are closed when only a very small speed variation occurs; this small variation causing only an inappreciable movement of the throttle and thereby causing a change in the torque which is ineffective to correct the speed of the prime mover. After the contacts are closed and the operation of the rheostat initiated, the rheostat operates to adjust the generator load in the manner explained, as long as the contacts remain closed. The degree of the load adjustment is not directly dependent upon the degree of the speed variation but upon the length of time that this small variation persists. The movement of the rheostat arm and therefore the adjustment of the generator load is proportional to the time that the speed variation persists.

In accordance with the provisions of the patent statutes, I have described the principle of operation of my invention, together with the apparatus which I now consider to represent the best embodiment thereof. The apparatus shown and described is, however, only illustrative. I intend in the appended claims, therefore, to cover all modifications which do not depart from the spirit and scope of my invention.

What I claim as new and desire to secure by Letters Patent of the United States, is:

1. A power system including a prime mover, a generator driven thereby having an excitation system, means responsive to speed variations of said prime mover for varying the torque of said prime mover, means responsive to speed variations of said prime mover for varying the excitation of said generator, and means for always causing variations in the excitation of said generator to occur before substantial changes in the torque of said prime mover are made.

2. A power system including a prime mover, a generator driven thereby having an excitation system, a motor arranged to receive current from said generator, means responsive to speed changes of said prime mover for varying the torque thereof, and means responsive to speed changes of said prime mover to always vary the excitation of said generator before the torque-varying means is operated sufficiently to affect the speed of the prime mover so as to maintain the speed of said prime mover constant by load regulation.

3. A power system including a prime mover, a generator driven thereby having an excitation system, a motor arranged to receive current from said generator, means responsive to speed variations of said prime mover for controlling the torque of said prime mover to maintain the speed of said prime mover within a predetermined range, and means responsive to speed variations of said prime mover for varying the excitation of said generator and for maintaining the speed of said prime mover within a range smaller than said predetermined range.

4. A power system including a prime mover, a throttle mechanism therefor arranged to control the torque of said prime mover, a generator driven by said prime mover, a motor arranged to receive current from said generator, a speed governor arranged to operate said throttle and maintain substantially constant any one of a plurality of predetermined speeds of said prime mover, means including a rheostat for varying the excitation of said generator, and means responsive to speed variations of said prime mover and arranged to initiate operation of said rheostat before said throttle is operated sufficiently to neutralize said speed variation for maintaining substantially constant throttle setting for each selected speed of said prime mover.

5. A power system including a prime mover, a generator driven thereby having an excitation system, means responsive to speed variations of said prime mover for varying the torque of said prime mover and for maintaining the speed of said prime mover substantially constant, means responsive to speed variations of said prime mover and arranged to vary the excitation of said generator for maintaining said prime-mover speed constant, and means for maintaining the torque of said prime mover constant and arranged to vary the excitation of said generator for maintaining said prime-mover speed substantially constant.

6. A power system including a prime mover, a generator driven thereby, a motor arranged to receive current from said generator, means including a speed responsive governor arranged to adjust the torque of said prime mover for maintaining substantially constant the speed of said prime mover at any one of a plurality of speeds, means responsive to the speed of said prime mover and arranged to vary the excitation of said generator, and means dependent upon said excitation varying means for maintaining substantially constant the respective speeds of said prime mover and for maintaining substantially constant the torque of said prime mover required for each of said speeds respectively.

7. A power system including a prime mover, a generator driven thereby having an excitation system, a motor arranged to receive current from said generator, means including a speed governor responsive to speed variations of said prime mover for varying the torque of said prime mover, means including a rheostat arranged for varying the excitation of said generator, and means including an electrical contact mechanism responsive to slight speed variations of said prime mover for operating said rheostat before the torque of said prime mover is sufficiently varied to compensate for said speed variation.

8. A power system for self-propelled vehicles including a prime mover, a generator driven thereby having an excitation system including an adjustable rheostat, a plurality of motors arranged to receive current from said generator, means responsive to speed changes of said prime mover for adjusting said rheostat, and means responsive to the adjustment of said rheostat for changing the electrical relation between said motors and said generator.

9. A power system including a prime mover, a generator driven thereby having an excitation system, a plurality of motors connected to said generator arranged to receive current therefrom, an adjustable rheostat connected in the excitation system of said generator provided with an actuating arm, means responsive to speed changes of said prime mover for moving said arm, and means dependent upon the position of said arm for changing the connections between said motors and generator.

10. A power system including a prime mover, a throttle mechanism therefor arranged to control the torque of said prime mover, a generator driven by said prime mover and having an excitation system, a plurality of motors arranged to receive current from said generator, means including a speed responsive governor for operating said throttle and for maintaining the speed of said prime mover substantially constant at any one of a plurality of predetermined speeds, means including a rheostat for varying the excitation of said generator, and means responsive to slight speed variations of said prime mover and arranged to operate said rheostat before said throttle mechanism is varied sufficiently to compensate for said speed variation for maintaining the opening of said throttle substantially constant at each selected speed of said prime mover.

11. A power system for a self-propelled vehicle including a prime mover, a generator connected thereto, a motor arranged to receive current from said generator, means responsive to speed changes of said prime mover and including an adjustable rheostat for varying the generator output in accordance with the speed changes of said prime mover, and means for automatically initially adjusting said rheostat between its limits of adjustment before any adjustment in response to the speed of said prime mover is made, so as to obtain a rapid response of said electrical system.

12. A power system including a prime mover, a generator connected thereto, a motor arranged to be supplied with current from said generator, a speed-responsive governor driven by said prime mover and provided with a contact, means controlled by said contact and responsive to an increase in the speed of said prime mover for increasing the power output of said generator, and means energized concurrently with said power increasing means for resisting the action of said governor and for changing the power output of said generator in a series of small successive steps.

13. A power system for a self-propelled vehicle including a prime mover provided with a speed-responsive governor, a generator driven thereby, a plurality of motors arranged to be supplied with current from said generator, means responsive to a speed change of said prime mover and including an adjustable rheostat for controlling said generator excitation in accordance with speed changes of said prime mover, means dependent upon the adjustment of said rheostat for changing the electrical relation between said generator and said motors, and means for temporarily reducing the power output of the generator and for concurrently changing the electrical relation of said motors and said generator to obtain smooth flow of power in said system upon changing said motor connections.

14. A power system including a prime mover, a generator driven thereby, means including a speed-responsive governor for controlling the speed of the prime mover and for controlling the excitation of said generator, and means responsive to an increase in the speed of the prime mover for increasing the excitation of said generator in a series of successive increments until the speed of said prime mover is reduced to the proper value.

15. A power system including a prime mover, a generator, means including a speed-responsive governor having a spindle for controlling the speed of said prime mover, means including a field rheostat for controlling the generator load on said prime mover, means including said governor spindle for controlling the throttle of said prime mover, means including a contact arranged to be operated by said spindle for controlling the adjustment of said generator field rheostat, and means energized during the adjustment of said field rheostat and arranged to counteract the movement of said spindle for arresting the adjustment of said generator field rheostat before sufficient adjustment thereof is made to compensate for speed variations of said prime mover, so as to make the complete adjustment of said rheostat in a series of small steps.

16. A power system including a prime mover, a generator driven thereby, and means including a field rheostat arranged to vary the excitation of said generator and responsive to speed changes of said prime mover for instantly varying the excitation of said generator when a change in the speed of said prime mover occurs and for subsequently varying the excitation of said generator an additional amount proportional to the speed change of said prime mover.

17. A power system including a prime mover, a generator driven thereby, and means including a field rheostat arranged to vary the excitation of said generator an amount dependent upon the setting of said rheostat and responsive to changes in speed of said prime mover for instantly varying the excitation of said generator when a change in speed of said prime mover occurs and for subsequently varying the excitation of said generator an additional amount proportional to the speed change of said prime mover and sufficiently to substantially neutralize said first variation as soon as said second variation is completed.

18. A power system including a prime mover, a generator driven thereby, and means including a field rheostat arranged to vary the excitation of said generator an amount dependent upon the setting of said rheostat and responsive to changes in speed of said prime mover for firstly instantly varying the excitation of said generator when a change in speed of said prime mover occurs and for secondly subsequently varying the excitation of said generator an amount proportional to the speed change of said prime mover and sufficiently to substantially neutralize said first variation as soon as said second variation is completed.

19. A power system including a prime mover, a generator driven thereby, and means responsive to speed variations of said prime mover for instantly increasing the excitation of said generator at the initiation of an adjustment of said generator excitation and for subsequently substantially neutralizing this increase in the generator excitation at the completion of said adjustment.

20. A power system including a prime mover, a generator driven thereby, means including a field rheostat provided with a resistor and a movable arm having spaced brushes controlling said resistor of said rheostat and responsive to speed variations of said prime mover for varying the excitation of said generator, and means responsive to a speed change of said prime mover for neutralizing the potential difference between the said brushes when the arm begins to move and for re-establishing the potential difference between said brushes at the end of the movement of said arm.

21. A power system including a prime mover, a generator driven thereby, means responsive to speed changes of said prime mover and including a field rheostat provided with a movable arm and a resistor having a plurality of taps along which said arm is arranged to move for varying the excitation of said generator, and means controlled in response to movement of said arm to a predetermined position for shunting large sections of said resistor.

22. A power system including a prime mover, a generator driven thereby, means including a main controller for selecting any one of a plurality of operating speeds of said prime mover, means including a speed-responsive governor having a movable contact and cooperating adjustable contacts for maintaining the speed of said prime mover substantially constant at any one of said selected speeds, and means including a generator field rheostat having an operating motor responsive to the opening and closing of said governor contacts for maintaining the generator load on said prime mover substantially constant at any one of said selected speeds.

23. A power system including a prime mover, a generator driven thereby, means including a main controller for selecting any one of a plurality of operating speeds of said prime mover, means including a speed-responsive governor having a movable contact and cooperating adjustable contacts for maintaining the speed of said prime mover substantially constant at any one of said selected speeds, and means including a generator field rheostat having an operating motor responsive to the opening and closing of said governor contacts for utilizing the full range of said generator field rheostat at any one of said selected speeds and for maintaining the generator load on said prime mover substantially constant at any one of said selected speeds.

24. A power system including a prime mover having a throttle, a generator driven thereby, means including a speed-responsive governor having cooperating contacts associated therewith and controlling said throttle for maintaining the speed of said prime mover at any one of a plurality of selected speed ranges, and means including an automatic rheostat and responsive to the opening and closing of said governor contacts for maintaining the speed of said prime mover at a speed within any one of said plurality of speed ranges, said last-mentioned means being independent of said throttle-controlling means.

25. A power system including a prime mover, a generator driven thereby, a plurality of motors arranged to receive current from said generator, means responsive to speed variations of said prime mover and including a generator field rheostat for varying the excitation of said generator, said generator field rheostat having a resistor divided into a plurality of sections and having a plurality of taps for gradually varying the resistance in each of said groups and a movable arm arranged to engage said taps to vary the resistance in said groups, and means responsive to the movement of said arm to predetermined positions for shunting certain sections of said resistor independently of said taps and for changing the electrical relation of said motors.

26. A power system including a prime mover, a generator driven thereby having an excitation system, means responsive to speed variations of said prime mover for varying the torque of said prime mover, said means being dependent upon the degree of the variation from the predetermined speed, means responsive to speed variations of said prime mover for varying the excitation of said generator, said means being dependent upon the length of time the speed is varied from the predetermined speed.

27. A power system including a prime mover, a generator driven thereby having an excitation system, means responsive to speed variations of said prime mover for varying the torque of said prime mover, said means being responsive to the degree of said speed variations and varying the torque in proportion to the degree of said speed variation, means responsive to the speed of said prime mover for varying the excitation of said generator, said means being responsive to a slight variation in speed and operable to change the excitation of said generator in proportion to the time that the speed of said prime mover has varied from the predetermined speed.

28. A power system including a prime mover, a generator driven thereby having an excitation system, a plurality of motors arranged to receive current from said generator, means including an adjustable rheostat arranged to vary the resistance in said excitation system and for controlling the electrical relation between said motors and said generator, means responsive to a slight variation from a predetermined speed of said prime mover for operating said rheostat, and means responsive to increasing current in said motors and decreasing load on said prime mover for controlling said rheostat.

29. A power system including a prime mover, a generator driven thereby having an excitation system including an adjustable rheostat arranged to vary the resistance in said excitation system, a plurality of motors arranged to receive current from said generator, means dependent upon said rheostat for controlling the electrical relation between said motors and said generator, means responsive to a slight variation from a predetermined speed of said prime mover for operating said rheostat, and means responsive to increasing current in said motors and decreasing load on said prime mover for controlling the electrical relation between said motors and said generator.

30. A power system including a prime mover, a generator driven thereby having an excitation system including an adjustable rheostat arranged to regulate said excitation system and having a movable arm for effecting the change of resistance in said rheostat, means for initially setting said arm intermediate its limits of movement, means responsive to the speed of said prime mover for moving said rheostat arm to maximum resistance position, and means including a main controller for increasing the power output of said prime mover sufficiently to cause the said rheostat arm to move toward the minimum resistance position before the arm can be moved in the opposite direction from its initial position.

JACOB W. McNAIRY.